(12) United States Patent
Liingaard et al.

(10) Patent No.: US 11,396,861 B2
(45) Date of Patent: Jul. 26, 2022

(54) ROTOR RESTRAINING APPARATUS AND METHOD FOR WIND TURBINES

(71) Applicant: Vestas Wind Systems A/S, Aarhus N. (DK)

(72) Inventors: Anders Haslund Liingaard, Hinnerup (DK); Claus Hald Therkildsen, Ryomgård (DK)

(73) Assignee: Vestas Wind Systems A/S, Aarhus N (DK)

( * ) Notice: Subject to any disclaimer, the term of this patent is extended or adjusted under 35 U.S.C. 154(b) by 369 days.

(21) Appl. No.: 16/342,680

(22) PCT Filed: Oct. 2, 2017

(86) PCT No.: PCT/DK2017/050325
§ 371 (c)(1),
(2) Date: Apr. 17, 2019

(87) PCT Pub. No.: WO2018/072797
PCT Pub. Date: Apr. 26, 2018

(65) Prior Publication Data
US 2021/0332791 A1 Oct. 28, 2021

(30) Foreign Application Priority Data
Oct. 20, 2016 (DK) .......................... PA 2016 70828

(51) Int. Cl.
*F03D 7/02* (2006.01)

(52) U.S. Cl.
CPC .......... *F03D 7/0268* (2013.01); *F03D 7/0248* (2013.01); *F05B 2240/211* (2013.01); *F05B 2260/31* (2020.08)

(58) Field of Classification Search
CPC ...... F03D 7/0248; F03D 7/0268; F03D 15/00; F05B 2240/60; F05B 2260/31; F16H 57/10; E05C 3/36; Y02E 10/72; Y02E 10/74
See application file for complete search history.

(56) References Cited

U.S. PATENT DOCUMENTS

2011/0133473 A1 6/2011 Signore et al.
2014/0133983 A1* 5/2014 Canedo Pardo ...... F03D 7/0268
416/9
(Continued)

FOREIGN PATENT DOCUMENTS

CN 101451509 A 6/2009
CN 201517466 U 6/2010
(Continued)

OTHER PUBLICATIONS

Danish Patent and Trademark Office, Search and Examination Report in PA 2016 70828, dated Apr. 20, 2017.
(Continued)

*Primary Examiner* — Christopher R Legendre
(74) *Attorney, Agent, or Firm* — Wood Herron & Evans LLP

(57) ABSTRACT

A rotor restraining apparatus (200) and methods for a wind turbine (1). The rotor restraining apparatus has a locking element (204) associated with a rotor (8, 203) of the wind turbine, a rotational axis of said rotor defining an axial direction, the locking element being at least part-circular in form. The locking element comprises a plurality of engagement formations (205) disposed on a periphery thereof. The apparatus also has a restraining member (206), comprising a plurality of engagement formations (207). The restraining member is movable substantially along said axial direction between: (a) a non-restraining position; and (b) a restraining position in which the restraining member engagement formations are able to engage the locking element engagement formations. At least a portion of the restraining member has an arcuate form that substantially matches the curvature of the locking element.

20 Claims, 8 Drawing Sheets

(56) References Cited

U.S. PATENT DOCUMENTS

| | | | |
|---|---|---|---|
| 2014/0322018 A1 | 10/2014 | Fritzsche et al. | |
| 2015/0096174 A1 | 4/2015 | Lohan et al. | |
| 2015/0260164 A1 | 9/2015 | Su | |
| 2016/0290318 A1 | 10/2016 | Muik | |
| 2021/0332791 A1* | 10/2021 | Liingaard | ............... F03D 80/00 |

FOREIGN PATENT DOCUMENTS

| CN | 202300839 U | 7/2012 |
|---|---|---|
| CN | 102635516 A | 8/2012 |
| EP | 1167755 A2 | 1/2002 |
| EP | 2565441 A1 | 3/2013 |
| EP | 2730779 A1 | 5/2014 |
| KR | 100821704 B1 | 4/2008 |
| KR | 20140038614 A | 3/2014 |
| KR | 20140072561 A | 6/2014 |

OTHER PUBLICATIONS

European Patent Office, International Search Report and Written Opinion in PCT Application No. PCT/DK2017/050325, dated Jan. 9, 2018.

* cited by examiner

ROTOR RESTRAINING APPARATUS AND METHOD FOR WIND TURBINES

FIELD OF THE INVENTION

This invention is directed to types of rotor restraining apparatus for wind turbines, and methods of operating such rotor restraining apparatus.

BACKGROUND OF THE INVENTION

Wind turbines for power generation are well known in the art. In a common arrangement, a nacelle is mounted on a tower, with a rotor and blades being mounted on the nacelle. The rotor is mounted on a rotor shaft which is supported in the nacelle by a shaft housing.

In certain situations, the rotor must be stopped, maintained in position, or locked to prevent any rotary movement, for example so that maintenance work can be carried out on the rotor or nacelle. In general, rotor braking and locking mechanisms are known. In one previously considered arrangement, a locking hub is mounted on the rotor shaft. The locking hub is a radial flange with holes that can be engaged by locking pins mounted to and movable to and from the housing. However, with the advent of larger turbine mechanisms, such a locking pin arrangement may not be appropriate, as the torque produced by the larger rotors could be sufficient to prevent locking with such pins, or to cause damage to the pins preventing proper use.

In another previously considered system, a brake disc connectable to the rotor shaft has a series of serrations on its outer rim, and a brake block with two corresponding serrations is brought from a radial direction into contact with the brake disc serrations, to prevent rotary movement of the brake disc, thereby stopping the rotor rotating. However, these radially applied brakes require additional space in the housing, and may also be relatively insecure even at low rotor torques, without considering the larger rotors coming into use.

A further problem with such serrated locking mechanisms may be that although the serrations are designed to cooperate or mesh to lock the rotor, it may nevertheless be difficult to get the corresponding serrations to engage each other properly, without additional fine rotational movement of the rotor and/or the locking brake. In addition, there can be an amount of play left in the system if the serrations do not match exactly, have become worn, or do not cooperate precisely. This can prevent adequate restriction of movement for maintenance, particularly for parts difficult to access, such as the turbine gear box.

The present invention aims to address these problems and provide improvements upon the known devices and methods.

STATEMENT OF INVENTION

One embodiment of an aspect of the invention can provide a rotor restraining apparatus for a wind turbine, comprising: a locking element associated with a rotor of the wind turbine, a rotational axis of said rotor defining an axial direction, the locking element being at least part-circular in form, the locking element comprising a plurality of engagement formations disposed on a periphery thereof; and a restraining member, comprising a plurality of engagement formations, wherein the restraining member is movable substantially along said axial direction between: (a) a non-restraining position; and (b) a restraining position in which the restraining member engagement formations are able to engage the locking element engagement formations, and wherein at least a portion of the restraining member has an arcuate form that substantially matches the curvature of the locking element.

The arcuate form of the restraining member and its axial application mean that the restraining member is far more secure than previously considered systems. The arcuate form allows for a much larger section of arc of the circular locking element to be addressed by the restraining member than in previously considered systems, which means that a large number (in contrast to just two or so) of engagement formations on the element and the member are engaged in order to provide the restraint. This is especially advantageous for the increasingly large wind turbine rotors being used. In various embodiments the number of engagement formations on the locking element and/or on the restraining member may be at least 3, 4, 5, 6, 7, or 8.

The restraining member may be movable in that at least some component of its movement is substantially in the axial direction. The axial direction is defined by the rotational axis of the rotor. Also within the scope of the invention is that the movement is not exactly along the rotational axis of said rotor as long as the movement is substantially in this direction and the same effect is achieved. For instance, in one embodiment the at least part-circular locking element could be mounted slightly off-axis of the rotor axis, in which case a movement along the axis of the locking element would cause the same effect. Further, a movement substantially along the rotational axis but instead in a direction slightly inclined towards the rotational axis would also lead to the same effect of locking but may even facilitate an easier locking sequence, as there may be initially a looser fit between the teeth, and then a tighter fit as the locking member is moved further towards the locking ring. This effect may have similar effects as described further later with respect to tapering of the teeth.

The locking element associated with the rotor may be couplable to, cooperate with, comply with, or collaborate with said rotor. The restraining member's restraining of the locking element may brake, constrain, lock or regulate the locking element. The non-restraining position may be a stowed position. The portion of the restraining member may have an arcuate form comparable to an arc of the locking element.

The engagement formations on either or both of the locking element and restraining member may be projections, serrations, engagement structures, or teeth. The formations may be for mating, cooperating with or meshing with the corresponding elements on the element/member.

The locking element may be circular, such as a disc or ring, or an annular element. The axis of the locking element may not necessarily be the same as that of the rotor. The locking element may be rotatable about an axis in cooperation with the rotor.

Optionally, the restraining member is elongated in a direction in, or parallel to, the plane of the locking element. Suitably, the restraining member extends through an arc comparable in shape to the arc of the locking element. Optionally, the restraining member engagement formations are disposed on the arcuate portion of the restraining member, and project radially inward from said arcuate portion.

In an embodiment, in the restraining position, the restraining member is disposed in the plane of the locking element, in a position adjacent to said periphery of the locking element, and in the non-restraining position, the restraining member is spaced from the position in the plane of and adjacent to the periphery of the locking element.

In embodiments, the locking element engagement formations comprise a set of teeth projecting from the periphery of the locking element. In some embodiments, the number of teeth in the set of teeth are at least 3, such as at least 4, 5, or 6.

In embodiments, the restraining member engagement formations comprise a set of teeth projecting from the restraining member. In some embodiments, the number of teeth in the set of teeth are at least 3, such as at least 4, 5, or 6.

Suitably, the locking element teeth project radially outward from the periphery thereof, and the restraining member teeth project radially inward from the restraining member and the apparatus is configured in the restraining position to mesh the respective sets of teeth together.

In an embodiment, the restraining member has a rear edge furthest from the locking element, and a front edge closest to the locking element, and the restraining member engagement formations comprise a gradient formed between said rear and front edges, so that the rear edge of the restraining member extends radially further inward than the corresponding front edge of the restraining member.

This tapering of the engagement formations of the locking element allows for easier engagement of the formations with those of the locking element. It can also prevent excessive play between the locking element and the restraining member when in the restraining position.

Suitably, the respective engagement formations comprise a rounded triangular profile.

One embodiment of another aspect of the invention can provide a method of restraining a wind turbine rotor using a rotor restraining apparatus as described herein, a rotational axis of said rotor defining an axial direction, the method comprising: rotating the locking element to a position at which the locking element engagement formations permit axial movement of the restraining member engagement formations; and moving the restraining member substantially along said axial direction from the non-restraining position to the restraining position so that the restraining member engagement formations are able to engage the locking element engagement formations.

One embodiment of another aspect of the invention can provide a rotor restraining apparatus for a wind turbine, comprising: a locking element being rotatable about an axis in cooperation with, and operable to restrain, a rotor of the wind turbine, a rotational axis of said rotor defining an axial direction, the locking element comprising a plurality of engagement formations disposed on a periphery of the locking element; and a restraining member, comprising a plurality of engagement formations, wherein the restraining member is movable substantially along said axial direction between: (a) a non-restraining position; and (b) a restraining position in which the member engagement formations are able to engage the locking element engagement formations, wherein the restraining member has a rear edge furthest from the locking element, and a front edge closest to the locking element, and wherein the restraining member engagement formations comprise a gradient formed between said rear and front edges, so that the rear edge of the restraining member extends radially further inward than the corresponding front edge of the restraining member.

One embodiment of another aspect of the invention can provide a wind turbine including a rotor restraining apparatus in accordance with any of the preceding embodiments.

One embodiment of another aspect of the invention can provide a rotor restraining apparatus for a wind turbine, comprising: a locking element associated with a rotor of the wind turbine, the locking element being at least part-circular in form, the locking element comprising a plurality of engagement formations disposed on a periphery thereof; and a restraining member, comprising a plurality of engagement formations, wherein the restraining member is movable substantially along said axial direction between: (a) a non-restraining position; and (b) a restraining position in which the restraining member engagement formations are able to engage the locking element engagement formations, and wherein the restraining member is elongated in the tangential direction of the locking element, across a predetermined arc of the locking element. Alternatively, the restraining member may be elongated in a direction in, or parallel to, the plane of the locking element.

BRIEF DESCRIPTION OF THE DRAWINGS

The invention will now be described by way of example with reference to the accompanying drawings, in which.

DETAILED DESCRIPTION OF EMBODIMENTS

Figure 1:
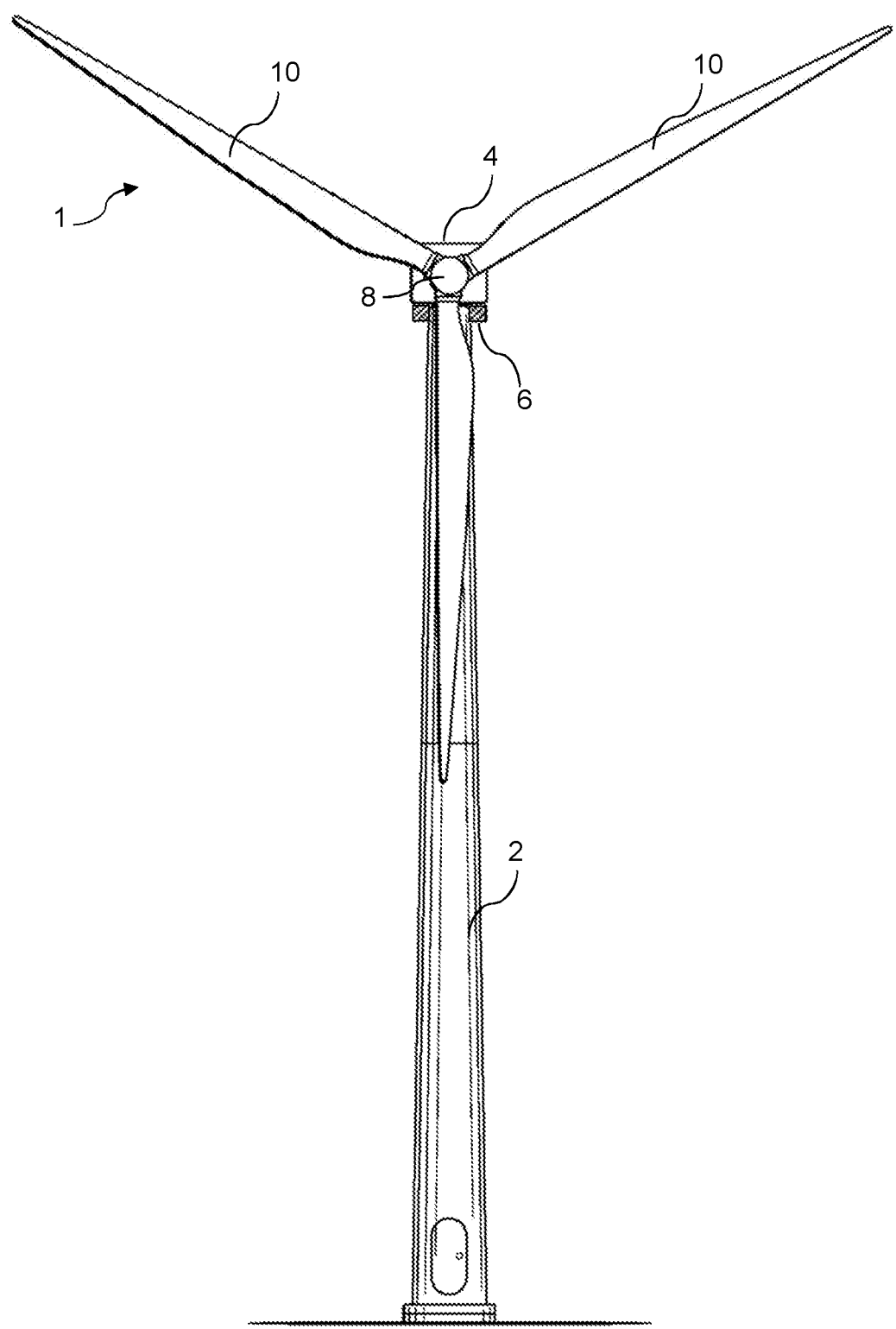
FIG. 1 is a diagram illustrating a typical wind turbine arrangement.

Referring to FIG. 1, a wind turbine 1 according to an embodiment of the invention comprises a tower 2, a nacelle 4 rotatably coupled to the top of the tower 2 by a yaw system 6, a rotating hub 8 mounted to the nacelle 4 and a plurality of wind turbine rotor blades 10 coupled to the hub 8. The nacelle 4 and rotor blades 10 are turned and directed into the wind direction by the yaw system 6. The nacelle 4 may house generating components of the wind turbine, including the generator, gearbox, drive train and brake assembly, as well as convertor equipment for converting the mechanical energy of the wind into electrical energy for provision to the grid. It may be noted that "direct drive" wind turbines that do not use gearboxes are also known; a gearbox may therefore be optional.

The nacelle 4 also necessarily contains a main shaft housing (not shown in FIG. 1), which houses a main rotor shaft that is connected at a forward end to the hub 8 and rotor blades 10, and at a rear end to the generating components.

Figure 2:
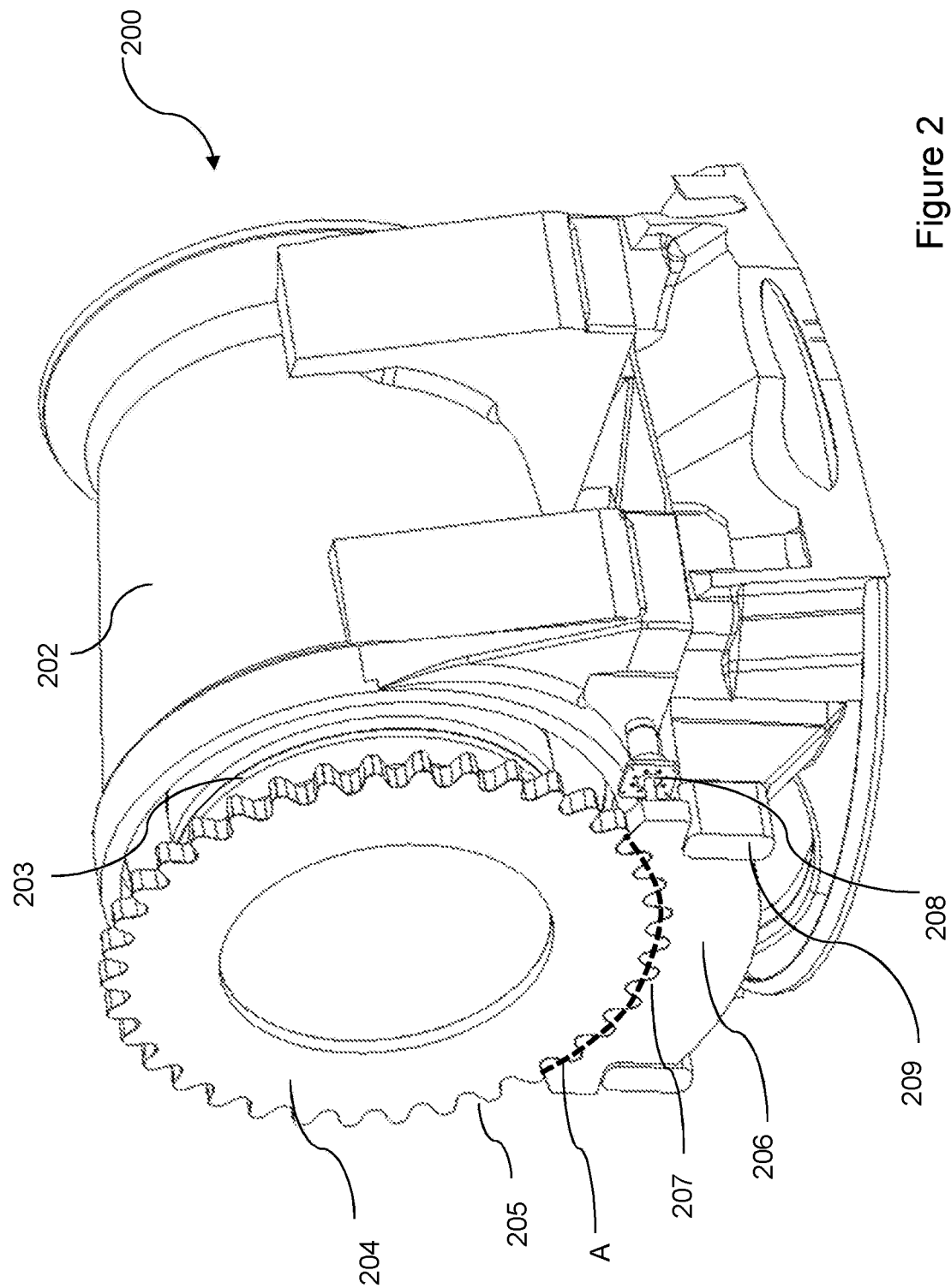
FIG. 2 is a schematic diagram of parts of a wind turbine, according to an embodiment of the invention.

FIG. 2 shows a close-up view of an assembly 200 of the wind turbine, that includes restraining apparatus (206, 208) and a main shaft housing 202; it may be appreciated that, for convenience, the assembly 200 is shown in isolation here without any of the other generating equipment attached to it.

The main shaft housing 202 encloses a rotor shaft 203 which is attached to the hub 8. The main shaft housing 202 also comprises a front bearing and a rear bearing (both not shown) which are suitable bearings, such as roller bearings, that enable the rotor shaft 203 to rotate about a horizontal axis. Note that in the art a main shaft housing may also be referred to as a main bearing housing.

The assembly also comprises a circular restraining or locking element 204, which in this embodiment takes the form of a locking ring. The locking ring is mounted, co-axially, on the rotor shaft 203, and therefore rotates with it; similarly, if the locking ring can be stopped or restrained, the rotor shaft will also be stopped, preventing rotation of the turbine rotor blades 10. In this embodiment the locking ring 204 is a single part, although it may also be a multipart assembly. Furthermore, although in this embodiment the locking ring 204 is circular such that it extends about the entirety of an axial position along the shaft, the locking ring 204 may instead be a part-circular element that extends only part-way about the rotor shaft.

In alternative embodiments, there may be arrangements in which the restraining element is not mounted directly on the rotor shaft, but is either mounted indirectly (but co-axially), or cooperates with the rotor shaft in some way (for example via a gearing system); however, in such embodiments, the cooperation is nevertheless such that, if the locking element is restrained or stopped, this has the effect of restraining or stopping the rotor shaft so as to lock the rotor out.

The locking ring 204 comprises a set of engagement formations, in this embodiment in the form of serrations or teeth 205 projecting radially outwards from the outer periphery of the locking ring. These formations are for mating with the corresponding formations on the locking member so that when the locking member is actuated, the meshing of the formations causes the locking ring to be constrained.

It can be seen that the particular form of the engagement formations may vary in alternative embodiments. For example, the formations may take the form of crenellations (that is, square shaped teeth) or other means capable of engaging the locking member so as to constrain the locking ring. The formations may also not be similar on the locking ring and the locking member; it may be that one has a male element and the other a female element for engaging the lock.

In other embodiments, the formations may not project radially outwards, but may project axially (such as in a crown gear), with the locking member having formations which also project axially to engage them. In other embodiments, the formations may be on an inner periphery of the locking ring, with the formations projecting radially inwards, with the locking member having formations projecting radially outwards.

In the embodiment illustrated in FIG. 2, the locking ring teeth are continuous around the outer periphery of the locking ring. This enables engagement of the locking member at any point on the locking ring. In alternative embodiments however, it may be that the engagement formations are discontinuous; there may be gaps in the series of formations, for example to allow space for other minor elements of the assembly, or it may be that in some cases a locking section on one side or along one circumferential section or arc of the locking ring is sufficient, and that the locking ring can simply be rotated until the locking section of the locking ring is aligned with the locking member. Expressed another way, the locking ring teeth should extend along a significant part of the circumference of the locking ring, but need not extend around the entire circumference.

The restraining member 206 is mounted on the rotor housing 202. Therefore the rotor and locking ring 204 are normally free to rotate inside the housing, but on engagement of the restraining member with the locking ring, since the restraining member is securely fastened to the housing, the locking ring and hence the rotor are no longer free to rotate.

The restraining or locking member 206 is disposed on the housing and is movable between a stowed position, and a locking position at which the engagement formations on the locking member engage or mesh with the corresponding and complementary formations on the locking ring, thereby constraining movement of the locking ring and locking out the rotor. In this embodiment, the locking member is moved between the two positions by an actuator 208 mounted on the housing. The actuator may be a hydraulic, linear electric, magnetic, or any similar suitable actuator.

The actuator moves the locking member axially (in the direction of the axis of the rotor and locking ring) from the stowed position, along slider means or elements 209 such as rails (though any other similar such linear bearing could be used) to the locking position. In the locking position, the locking member is thus disposed radially outward of the locking ring, and in contact with a circumferential portion of the locking ring.

This is in contrast to previously considered systems in which a brake is applied radially to a locking portion; the axial movement of the locking member 206 allows for the fixtures and sliders of the locking arrangement to be more secure than such radial means. At very high torques, it may be easier for a radially applied locking element to come free from its mounting and radial actuator, than for an axially applied locking element.

In other alternative embodiments, it may be that the axial movement of the locking member is actually applied off-axis, though with some component of the movement in the axial direction (and therefore some component also in the radial direction). For example, it may be that the geometry of a particular rotor housing prevents a precisely aligned axial approach of the control member into the restraining position, but nevertheless that the approach having some component in the axial direction still provides the advantages of saving space and of providing a more secure restraining basis than for a radially applied member.

The locking member 206 has cooperating engagement formations 207, in this embodiment in the form of teeth projecting radially inward towards the locking ring. Thus, when the locking member 206 is in the locking position, the teeth engage directly with the adjacent locking ring teeth.

Again, in alternative embodiments, the formations on the locking member 206 may take different forms, in order to cooperate with the different possible forms outlined above regarding the locking ring 204.

The locking member 206 is elongated (in the plane of the locking ring) so that it extends along a circumferential portion or arc of the locking ring 204. This allows in contrast to previous systems a much larger proportion of the teeth of the locking ring 204 to be engaged by the teeth of the locking member 206. This also provides a more secure and robust locking system, especially at high torques for larger turbines.

In this embodiment, the locking member 206 is also curved or arcuate, so that in the locking position its form follows that of the circular locking ring. As can be seen from FIG. 2, the teeth on the locking member 206 are not arranged in a straight line along the locking member, but in an arc following the arc of the locking ring 204. In particular, the teeth tips and the teeth troughs together describe respective arcs or curves. In effect, therefore, the curvature of the locking ring 206 is concentric with at least the curvature of the adjacent section of the locking ring 204. Indeed, as shown in in FIG. 2 by the dashed line labelled A, the line of curvature or arc defined by the teeth of the locking member 206 is coincident with the line of curvature or arc defined by the teeth of the locking ring 204. In one sense, the curvature of the adjacent portions of the locking member 206 and the locking ring 204 are substantially complementary or matching, or corresponding, so that they are able to fit together in a mating engagement. This also provides a more secure locking system; because the locking surface of the locking member is arcuate, more teeth (than for a simple straight line of teeth) can be engaged with the locking ring 206, allowing a greater proportion of the locking ring to be engaged, and therefore providing greater locking force against larger torques on the rotor.

For example, in an arrangement in which a brake is applied radially, the brake has only two or three serrations for engaging with the corresponding teeth on the braking disc, and even then the teeth may only partially mesh. This is in part due to the brake being limited in width, and therefore not being able to address a significant proportion of the arc of the braking disc.

In embodiments of the invention, the elongate nature of the locking member allows a large number or proportion of the engagement formations/teeth of the locking ring to be engaged. In addition, the arcuate form of the locking member in the embodiments described herein means that where otherwise elongation of the locking member would not engage further teeth (as the arc of the locking ring would fall away from the linear array of the locking member teeth), curvature of the locking member's array of teeth can follow the arced circumference of the locking ring and therefore engage even more of the teeth.

Figure 3:
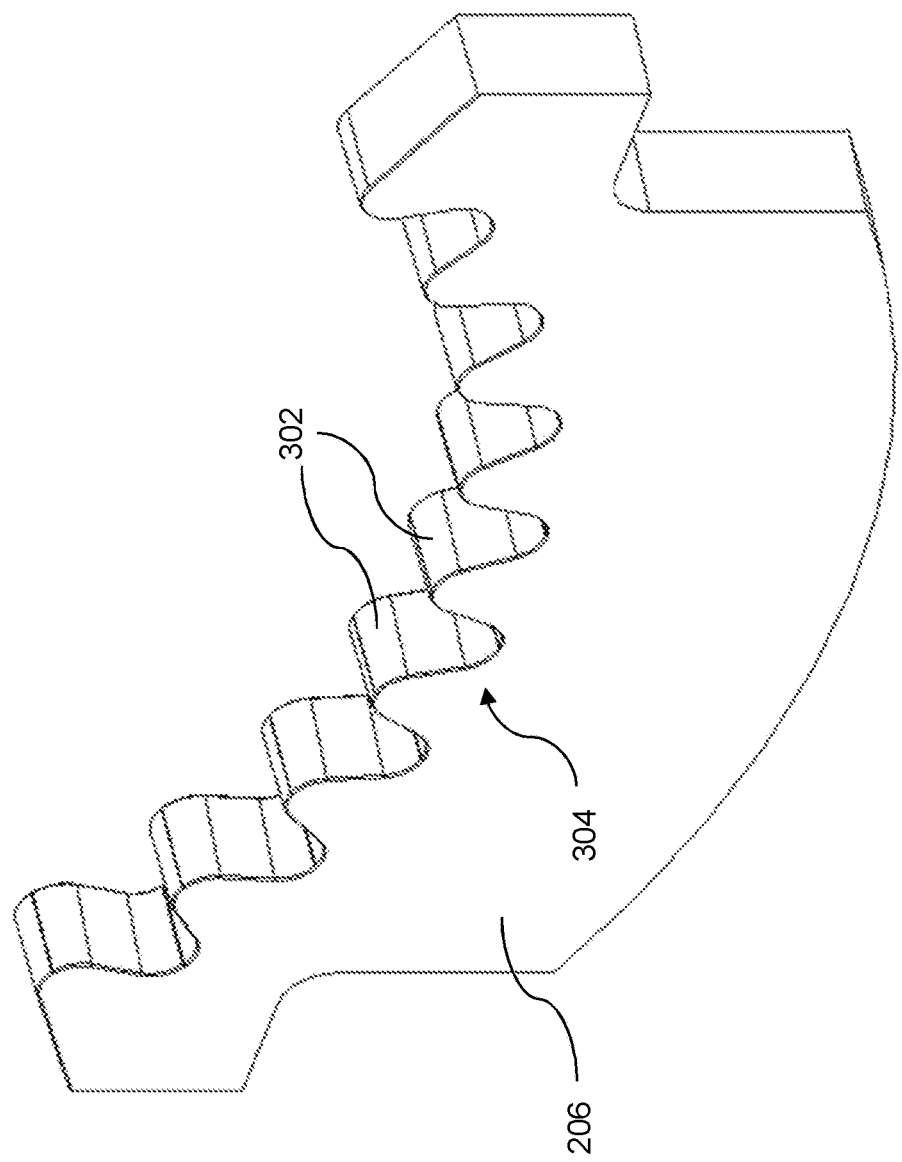
FIG. 3 is an enlarged schematic diagram of the restraining member illustrated in FIG. 2, according to an embodiment of the invention.

In the embodiment shown in FIGS. 2 and 3, there are nine teeth on the locking member, all of which engage the teeth of the locking ring. The percentage of the circumference of the locking ring engaged is around 25%, that is an arc subtending an angle of around 90 degrees. In other embodiments, it is envisaged that the arc engaged may be at least 10% of the available engagement formations on the locking ring. In embodiments where the teeth are continuous around the locking ring, the arc engaged will be less than 100%, as the locking member is not continuous around the entire ring. Typically therefore in such an embodiment the locking member will have at least four or five such teeth.

In some embodiments, it may be that only the surface of the locking member facing the teeth on the locking ring 206 is arcuate in this fashion. In other embodiments with alternative arrangements for the form, angle or direction of the engagement formations on the locking ring 204, the arc may be in a different but complementary direction to follow the different arrangement. For example, if the locking ring uses a crown gear with axial teeth, the locking member may have teeth also arranged axially, but in an arc following that of the crown gear. In an alternative embodiment for such a crown gear arrangement, the locking member may simply have teeth which are longer in the plane of the locking ring, with a generally linear elongate locking member, which can nevertheless therefore engage the locking ring along a section of its arc despite not being arcuate.

In such embodiments as shown in FIG. 2, the stability and security of the locking/restraining action of the locking member 206 is supported and enhanced by the mounting of the locking member on the housing. In this embodiment as noted above the locking member is supported by and moved on a linear slider mechanism in the form of rails or slider bars 209. In this embodiment a notch is provided at each end of the elongated locking member 206, which notch receiving the rail or bar 209. During activation of the actuator 208, the locking member is transported to/from the locking ring 204 by a camming action of the (notches of the) locking member along this rail.

It is notable that the rails 209 are disposed on either side of the locking member 206, rather than for example at the base of the locking member opposite the locking ring 204. This means that for the torques on the locking ring, the forces transferred to the locking member in order to maintain the lock are transferred largely laterally and linearly onto these rails, tangentially to the locking ring (and the rotor). In contrast, a system in which the mounting of the locking member is at its base, the forces transferred may have significant rotational and torsional components on that mounting. In such high torque systems, which may have to withstand significant wind speeds in order to lock out the rotor, it is typically preferable for the forces to be transferred largely linearly in the manner described, as the rail mounting on the housing can be braced comfortably for these largely linearly applied forces.

In particular it is notable that since the locking member is elongated, the rail 209 is spaced far apart from its opposite rail 209 on the other side of the locking member 206, and the rails are relatively close to the periphery of the locking ring 204. This minimises any levering effects of the forces on the locking member.

FIG. 3 is an enlarged schematic diagram of the locking member 206 illustrated in FIG. 2. The locking member 206 has locking teeth 302 projecting radially inward; in this embodiment, the teeth take the form of rounded triangulations 304 along the inner face of the locking member 206. The rounded teeth allow for an easier meshing action with the teeth of the locking ring 204 during the axial movement from the stowed position to the locking position. Leading and trailing edges of the teeth, with respect to the axial direction of movement, may be rounded, burred or chamfered or otherwise smoothed, to help the teeth engage smoothly.

Figure 4:
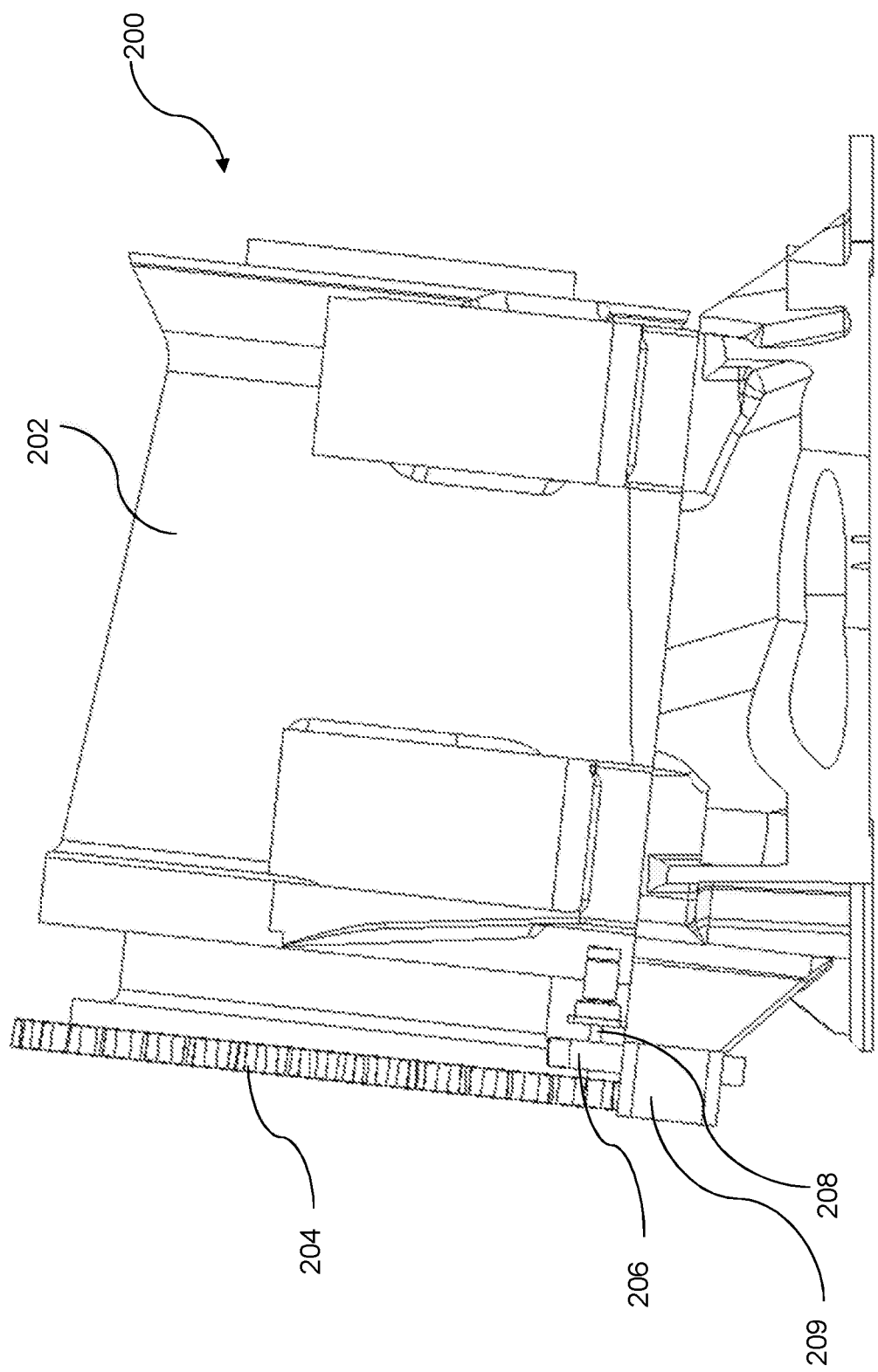
FIGS. 4 to 6 are schematic diagrams illustrating the actuation of the restraining member, according to an embodiment of the invention.
Figure 5:
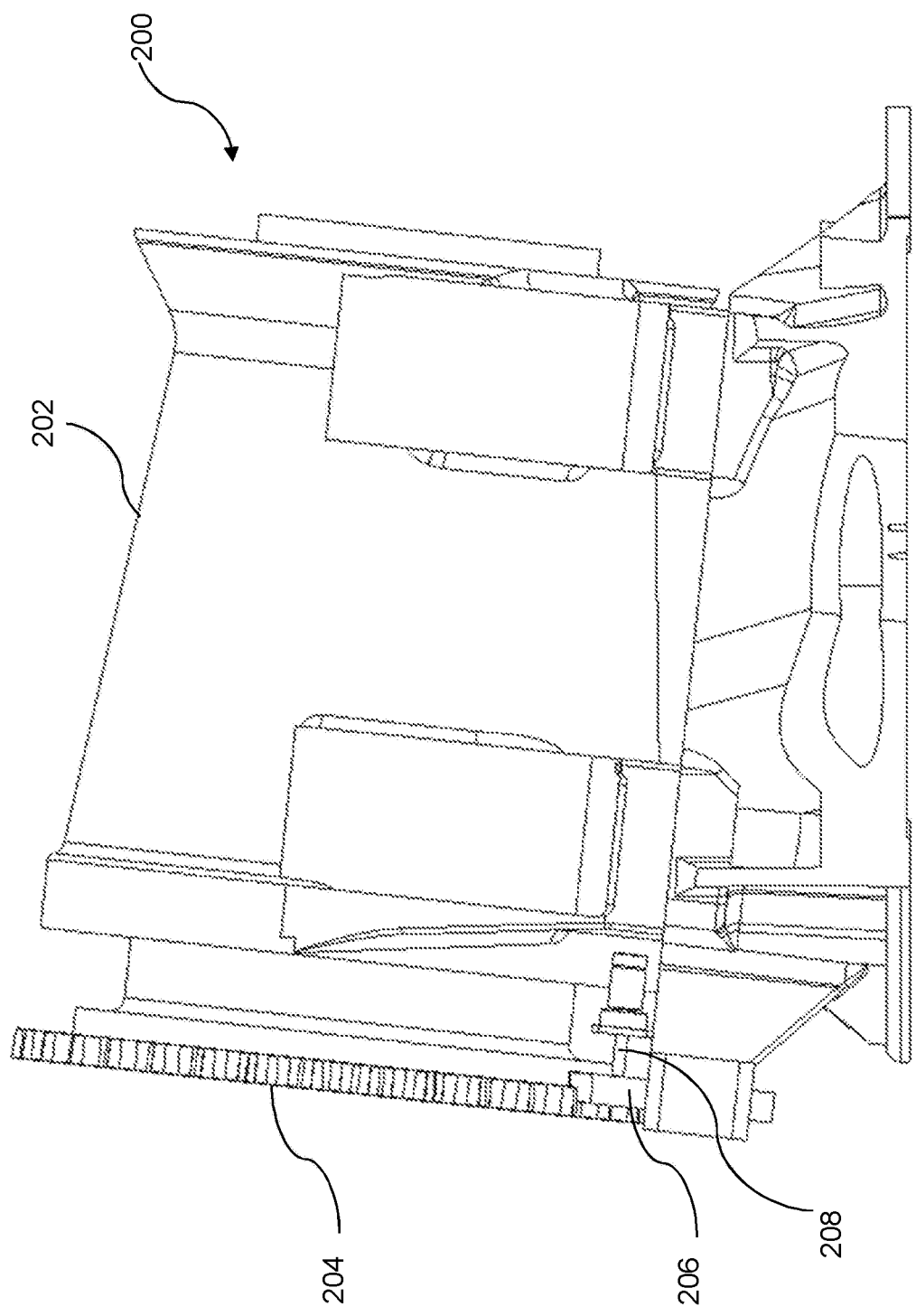
Figure 6:
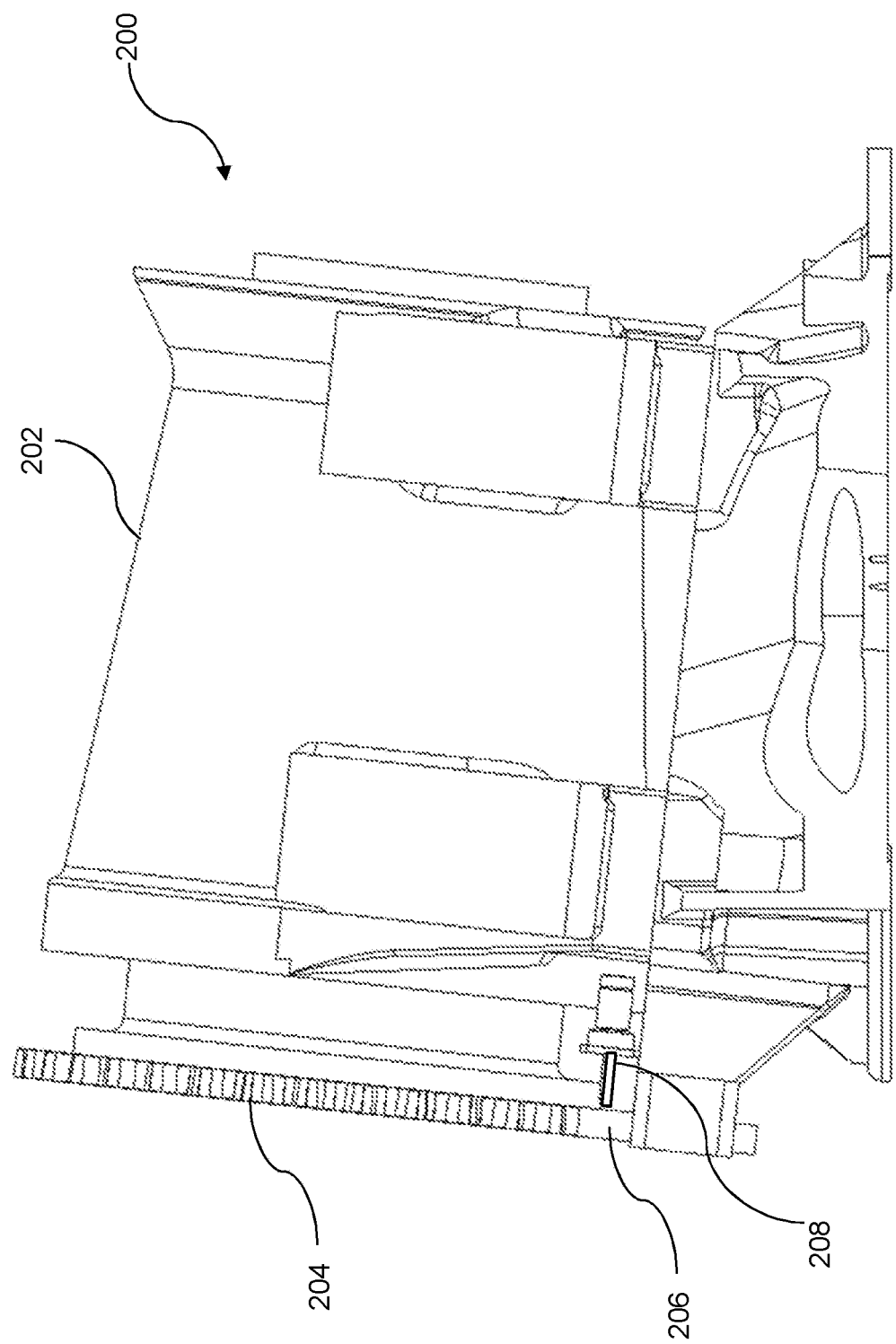

FIGS. 4 to 6 are schematic diagrams illustrating the actuation of the locking member 206, according to an embodiment of the invention. In FIG. 4 it can be seen that the locking member 206 is in the stowed position, in that it is spaced from and so not currently in the plane of the locking ring 204, and therefore the locking teeth on the locking member 206 are not in contact with the teeth on the locking ring 204.

As can be seen from FIG. 5, as the actuator 208 pushes the locking member 206 along the slider rails 209, the teeth 302 begin to enter the plane of the locking ring 204, and peaks/crests of the locking member 206 teeth are aligned with the troughs of the locking ring teeth, to allow the axially sliding action to move the locking member into place.

FIG. 6 illustrates the locking position, in which the actuator 208 is fully extended, the locking member 206 is fully aligned with the plane of the locking ring 204, that is, in a fully engaged position, and the cooperating teeth are meshed together, locking out the rotor.

Figure 7:
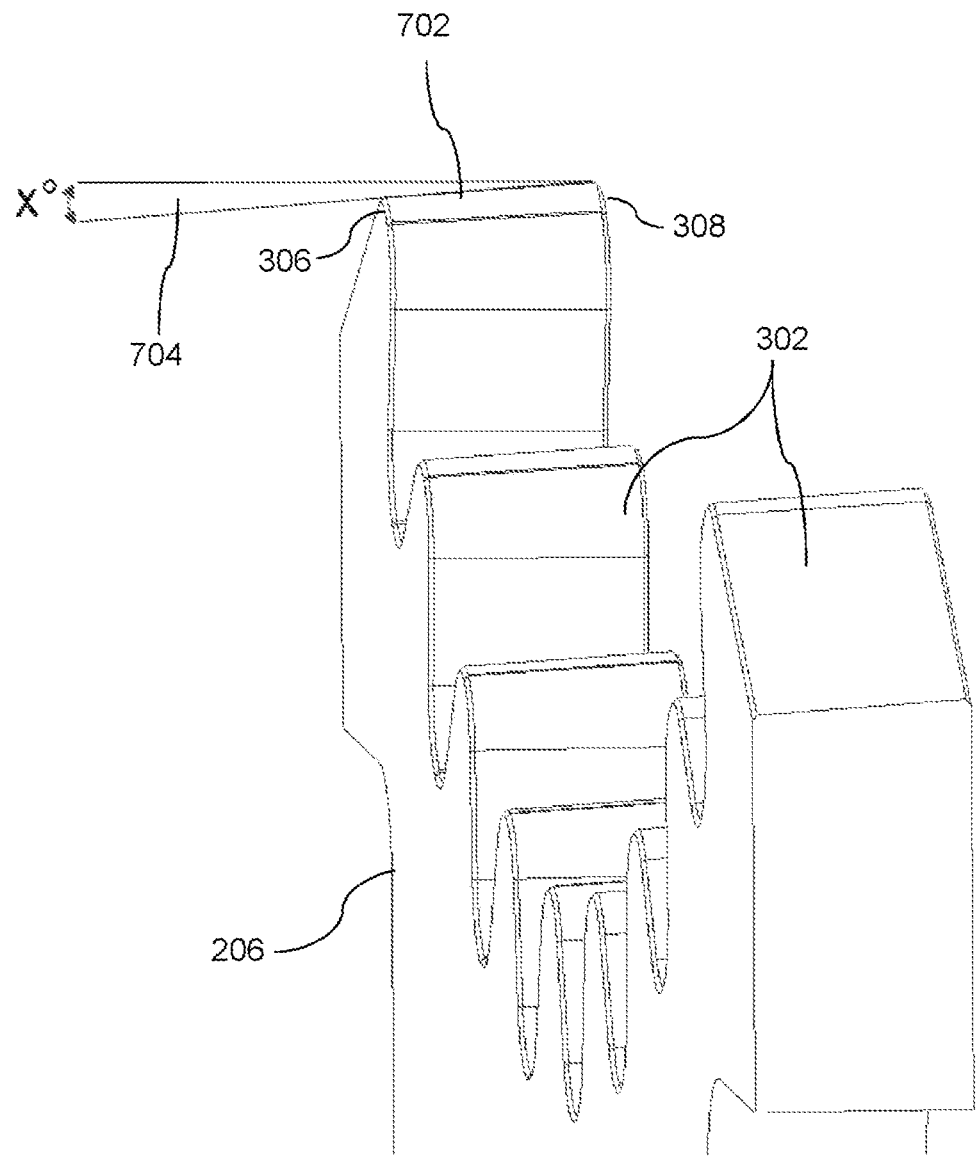
FIG. 7 is an enlarged view of the engagement formations on the restraining member, according to an embodiment of the invention.

FIG. 7 is an enlarged view of the engagement formations on the locking member 206, according to an embodiment of the invention. In this embodiment, the engagement formations are formed so that the peaks 702 of the locking teeth 302, that is the teeth tips, are angled, tapered, or inclined in the direction of the locking ring, so that a rear-most edge (trailing edge 308) of the locking member tooth peak is radially further inward, that is to say higher, than the front edge (leading edge 306), the front edge being the closest to the locking ring 204 in the stowed position. The taper of the teeth from rear to front can be set at a give gradient or angle X (704). Expressed another way, the teeth are shaped to define a slight wedge shape between their leading and trailing edges.

This arrangement means that as the locking member teeth are pushed further onto the locking ring 204 (see FIGS. 5 and 6) the contact between the locking member teeth 302 and the locking ring teeth is increased, because of the increasing gradient of the locking member teeth, and their effective progression radially inwards towards the locking ring.

This can facilitate an easier locking sequence, as there may be initially a looser fit between the teeth, and then a tighter fit as the locking member is moved further axially towards the locking ring. This arrangement therefore accommodates slight misalignment between the teeth of the locking member 206 and the locking ring 204 prior to engagement. The tapering can also provide eventually a more secure locking of the rotor, as the more the locking member is pushed onto the locking ring, the more surfaces of the meshing teeth will be in contact with each other, and the more the locking member will exert force radially inwards onto the locking ring. This system can therefore prevent the residual play in the locking system experienced by previously considered systems.

It should be noted that the troughs of the locking member teeth, and indeed the entire profile of the teeth can be tapered in this way. This means that not only does the radial force inward on the locking ring increase as the locking member is pushed onto the ring, but in the same manner the force will increase along the entire tooth profile, with additional force exerted laterally/circumferentially between the teeth along the tapering profile.

It may be noted that similar effects and advantages will apply in embodiments in which the locking member is pushed onto the ring in a direction which is not precisely axial, but has some axial component (i.e. at an angle not orthogonal to the plane of the locking ring). Since the teeth are in any case tapered in the radial direction, if there is a radial component to the movement from the stowed to the engaged position, there will also be an effect in the radial direction of increasing contact and forces between the teeth as described above regarding the effect in the axial direction.

Figure 8:
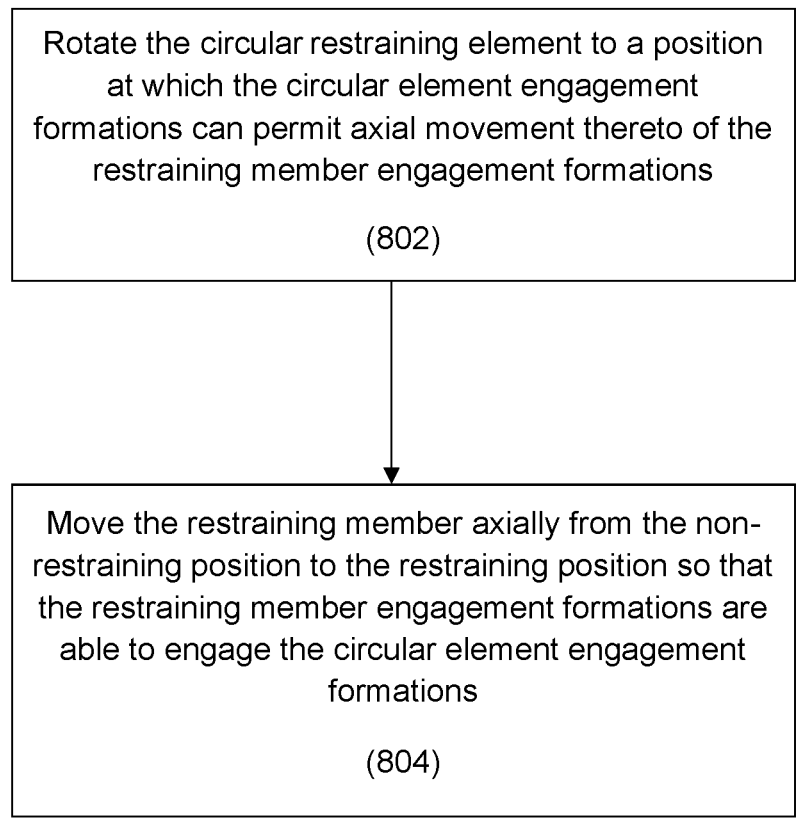
FIG. 8 is a diagram illustrating steps of a method according to an embodiment of the invention.

FIG. 8 is a diagram illustrating steps of a method according to an embodiment of the invention. In order for the corresponding engagement formations on the locking ring and the locking member to engage, it will typically be necessary to rotate (802) the locking ring so that the peaks and troughs of the respective sets of teeth are somewhat aligned, before moving the locking member (804) from the stowed position to the locking position so that the teeth can be engaged.

In an embodiment, the teeth on the locking member can be tapered (as described above) sufficiently that this alignment step may be obviated—the tapered profile can effectively push the locking ring around a small rotation as the locking member is actuated into place.

In another alternative embodiment, the engagement formations or teeth on both the locking ring and the locking member may be tapered in this way and/or as described above, for ease of engagement and to allow an even more secure engagement once the locking member is finally in place.

It will be appreciated by those skilled in the art that the invention has been described by way of example only, and that a variety of alternative approaches may be adopted without departing from the scope of the invention, as defined by the appended claims.

The invention claimed is:

1. A rotor restraining apparatus for a wind turbine, comprising:
   a locking element associated with a rotor of the wind turbine, a rotational axis of said rotor defining an axial direction, the locking element being at least part-circular in form,
   the locking element comprising a plurality of engagement formations disposed on a periphery of the locking element; and
   a restraining member, comprising a plurality of engagement formations, wherein the restraining member engagement formations comprise a set of teeth projecting from the restraining member,
   wherein the restraining member is movable substantially along said axial direction between: (a) a non-restraining position; and (b) a restraining position in which the restraining member engagement formations are able to engage the locking element engagement formations,
   wherein the restraining member extends through an arc substantially matching in curvature to at least a portion of the locking element,
   and wherein the restraining member engagement formations are disposed on an arcuate portion of the restraining member and project radially inward from said arcuate portion.

2. The apparatus according to claim 1, wherein the restraining member is elongated in a direction in, parallel to, a plane of the locking element.

3. The apparatus according to claim 1, wherein in the restraining position, the restraining member is disposed in a plane of the locking element, in a position adjacent to said periphery of the locking element,
   and wherein in the non-restraining position, the restraining member is spaced from the position in the plane of and adjacent to the periphery of the locking element.

4. The apparatus according to claim 1, wherein the locking element engagement formations comprise a set of teeth projecting from the periphery of the locking element.

5. The apparatus according to claim 4, wherein the number of teeth in the set of teeth of the locking element engagement formations is at least 3.

6. The apparatus according to claim 1, wherein the locking element engagement formations comprise a set of teeth projecting from the periphery of the locking element, wherein the locking element teeth project radially outward from the periphery of the locking element,
   and wherein the teeth of the restraining member mesh with the teeth of the locking element in the restraining position.

7. The apparatus according to claim 1, wherein the restraining member has a rear edge furthest from the locking element in the non-restraining position and a front edge closest to the locking element in the non-restraining position,
   and wherein the restraining member engagement formations comprise a gradient formed between said rear and front edges, so that the rear edge of the restraining member extends radially further inward than the corresponding front edge of the restraining member.

8. The apparatus according to claim 1 wherein the restraining member and locking element engagement formations comprise a rounded triangular profile.

9. The apparatus according to claim 1, comprising at least three of the locking element engagement formations and at least three of the teeth.

10. The apparatus according to claim 1, wherein the numbers of locking element and restraining member engagement formations are at least 4.

11. A method of restraining the wind turbine rotor using the rotor restraining apparatus according to claim 1, the method comprising:
rotating the locking element to a position at which the locking element engagement formations permit axial movement of the restraining member engagement formations; and
moving the restraining member substantially along said axial direction from the non-restraining position to the restraining position so that the restraining member engagement formations are able to engage the locking element engagement formations.

12. A rotor restraining apparatus for a wind turbine, comprising:
a locking element being rotatable about an axis in cooperation with, and operable to restrain, a rotor of the wind turbine, a rotational axis of said rotor defining an axial direction,
the locking element comprising a plurality of engagement formations disposed on a periphery of the locking element; and
a restraining member, comprising a plurality of engagement formations, wherein the restraining member engagement formations comprise a set of teeth projecting from the restraining member,
wherein the restraining member is movable substantially along said axial direction between: (a) a non-restraining position; and (b) a restraining position in which the restraining member engagement formations are able to engage the locking element engagement formations,
wherein the restraining member has a rear edge furthest from the locking element in the non-restraining position and a front edge closest to the locking element in the non-restraining position,
and wherein the restraining member engagement formations comprise a gradient formed between said rear and front edges, so that the rear edge of the restraining member extends radially further inward than the corresponding front edge of the restraining member.

13. A rotor restraining apparatus for a wind turbine, comprising:
a locking element associated with a rotor of the wind turbine, a rotational axis of said rotor defining an axial direction, the locking element being at least part-circular in form,
the locking element comprising a plurality of engagement formations disposed on a periphery of the locking element; and
a restraining member, comprising a plurality of engagement formations, wherein the restraining member engagement formations comprise a set of teeth projecting from the restraining member,
wherein the restraining member is movable substantially along said axial direction between: (a) a non-restraining position; and (b) a restraining position in which the restraining member engagement formations are able to engage the locking element engagement formations,
wherein at least a portion of the restraining member has an arcuate form that substantially matches a curvature of the locking element,
wherein the locking element engagement formations comprise a set of teeth projecting from the periphery of the locking element, wherein the locking element teeth project radially outward from the periphery of the locking element, and wherein the restraining member teeth project radially inward from the restraining member,
and wherein the teeth of the restraining member mesh with the teeth of the locking element in the restraining position.

14. The apparatus according to claim 13, wherein the restraining member is elongated in a direction parallel to, a plane of the locking element.

15. The apparatus according to claim 13, wherein in the restraining position, the restraining member is disposed in a plane of the locking element, in a position adjacent to said periphery of the locking element,
and wherein in the non-restraining position, the restraining member is spaced from the position in the plane of and adjacent to the periphery of the locking element.

16. The apparatus according to claim 13, wherein the number of teeth in the set of teeth of the locking element engagement formations is at least 3.

17. The apparatus according to claim 13 wherein the restraining member and locking element engagement formations comprise a rounded triangular profile.

18. The apparatus according to claim 13, comprising at least three of the locking element engagement formations and at least three of the restraining member engagement formations.

19. The apparatus according to claim 13, wherein the numbers of locking element and restraining member engagement formations are at least 4.

20. A method of restraining the wind turbine rotor using the rotor restraining apparatus according to claim 13, the method comprising:
rotating the locking element to a position at which the locking element engagement formations permit axial movement of the restraining member engagement formations; and
moving the restraining member substantially along said axial direction from the non-restraining position to the restraining position so that the restraining member engagement formations are able to engage the locking element engagement formations.

* * * * *